United States Patent [19]

Hirama

[11] 4,098,644

[45] Jul. 4, 1978

[54] NUCLEAR FUEL ELEMENT

[75] Inventor: Hideo Hirama, Tokyo, Japan

[73] Assignee: Kabushiki Kaisha Daini Seikosha, Japan

[21] Appl. No.: 771,516

[22] Filed: Feb. 24, 1977

[30] Foreign Application Priority Data

Feb. 27, 1976 [JP] Japan ............................ 51-21529

[51] Int. Cl.² .............................................. G21C 3/02
[52] U.S. Cl. ....................................... 176/68; 176/76; 176/78
[58] Field of Search ............................. 176/68, 76, 78

[56] References Cited

U.S. PATENT DOCUMENTS

| | | | |
|---|---|---|---|
| 3,607,638 | 9/1971 | Selm | 176/68 |
| 3,804,710 | 4/1974 | Bresnick | 176/68 X |
| 3,963,566 | 6/1976 | MacMillan et al. | 176/68 |
| 4,011,134 | 3/1977 | Stehle et al. | 176/68 |

Primary Examiner—Peter A. Nelson
Attorney, Agent, or Firm—Robert E. Burns; Emmanuel J. Lobato; Bruce L. Adams

[57] ABSTRACT

A nuclear fuel element comprises an elongated tube having upper and lower end plugs fixed to both ends thereof and nuclear fuel pellets contained within the tube. The fuel pellets are held against the lower end plug by a spring which is supported by a setting structure. The setting structure is maintained at a proper position at the middle of the tube by a wedge effect caused by spring force exerted by the spring against a set of balls coacting with a tapered member of the setting structure thereby wedging the balls against the inner wall of the tube and the setting structure is moved free by pushing with a push bar against the spring force so as to release the wedge effect.

1 Claim, 4 Drawing Figures

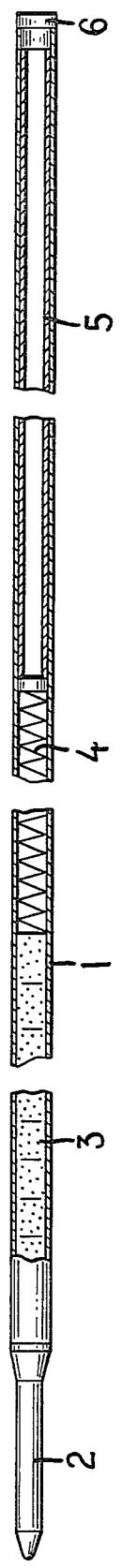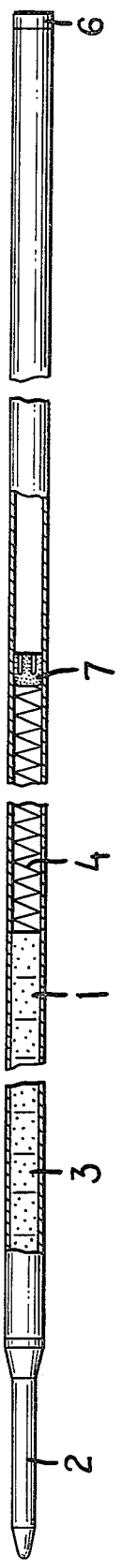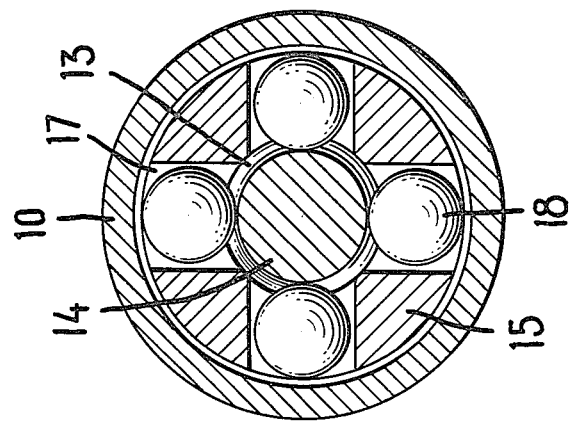

NUCLEAR FUEL ELEMENT

BACKGROUND OF THE INVENTION

This invention relates to a nuclear fuel element containing nuclear fuel therein for use in a nuclear reactor.

A nuclear fuel element for use in a nuclear reactor comprises an elongated tube formed of heat-resistant alloy such as stainless steel, nuclear fuel pellets contained in the tube, and a setting structure for immovably positioning and setting the pellets in the axial direction of the tube. In the nuclear fuel element, nuclear fission of the fuel caused by irradiation of neutron or the like accompanies FP-gas (nuclear fission product) generation, so that it is necessary to elongate the tube far longer than the total length of the tube occupied by the fuel pellets to provide enough space for receiving FP-gas therein at lower pressure.

Therefore, a conventional nuclear fuel element has, as shown in FIG. 1A, a tube 1, a lower end plug 2 securely fixed to an end of the tube 1, fuel pellets 3 located at the lower end plug side of the tube, an upper end plug 6 securely fixed to the other end of the tube 1, a sleeve 5 placed adjacent to the upper end plug 6 in the tube, and a spring 4 inserted between the pellets and the sleeve to immovably set the pellets 3. Another nuclear fuel element is shown in FIG. 1B in which the fuel pellets 3 are set by an elastic stopper 7 through spring 4, the elastic stopper 7 being forced into the tube 1 and the fuel middle of the tube 1 due to functional engagement with the tube inner wall.

The FIG. 1A embodiment is disadvantageous in that the elastic force of spring 4 is applied by way of sleeve 5 to the upper end plug 6 so that the aerial space for receiving FP-gas in the tube becomes less because of the sizable space occupied by the sleeve 5. The FIG. 1B embodiment is disadvantageous in that elastic stopper 7 is in danger of moving and injuring the tube on shock or acceleration during transportation of the tube.

BRIEF SUMMARY OF THE INVENTION

Therefore, it is an object of the present invention to provide a nuclear fuel element in which enough space is provided for satisfactorily receiving the reactive gases and in which the fuel pellets are securely kept set at a proper position by a setting structure even if shock or large acceleration is applied to the fuel element.

The nuclear fuel element construction according to this invention is almost the same as that shown in FIG. 1B but has characteristic features in the main structure of the stopping mechanism to support the spring 4, while the other structure of the lower end plug 2, nuclear fuel pellets 3 and upper end plug 6 is the same.

BRIEF DESCRIPTION OF THE DRAWINGS

FIGS. 1A and 1B are longitudinal views, partially sectioned, showing conventional nuclear fuel elements, FIG. 2 is a partial longitudinal sectional view showing a setting structure for the nuclear fuel pellets of a nuclear fuel element according to the invention, and FIG. 3 is a sectional view taken on line III—III of FIG. 2.

DETAILED DESCRIPTION OF THE PREFERRED EMBODIMENT

As the fuel element of the invention is almost the same as that in FIG. 1B, a preferred embodiment of this invention will be described referring to FIGS. 2 and 3 which show the main structure of a nuclear fuel according to the invention.

Numeral 10 designates the same elongated type tube made of stainless steel or the like as the tube 1 described above. A rod 11 is inserted into tube 10, said rod 11 being provided with an end flange 12 engageable with a spring 4, a tapered portion 13 and a narrow portion 14 at the middle thereof. Numeral 15 designates a sleeve slidably surrounding the cylindrical portion 16 of said rod 11 and having four holes 17 equally spaced about the circumference thereof. There is enough of a gap between the inner wall of tube 10 and the outer periphery of sleeve 15 for gas to pass therethrough, and enough of a gap or clearance between the inner wall of sleeve 15 and the outer periphery of rod 11 to enable axial sliding of the rod 11. Sleeve 15 is caulked at the ridge of the holes 17 for holding stainless steel balls 18 which are movably inserted therein. The balls are rollable in the holes and engageable between the tapered portion 13 of rod 11 and the inner wall of tube 10 so as to releasably wedge the setting structure in place.

In the pellet setting operation, after nuclear fuel pellets 3 and spring 4 are all inserted into tube 1 and the lower end plug 2 is securely fixed thereto, and while the upper end plug 6 is removed, the setting structure consisting of sleeve 15, rod 11 and stainless steel balls 18 is pushed into the tube 1 by a push bar 19, in the direction of arrow A. The push bar 19 may be provided with a projection 19a to make contact with the end of rod 11 while the shoulder end 19b thereof pushes the end of sleeve 15. In this positional condition, the steel balls 18 are all free to roll so that the structure can move smoothly against spring 4 until the pellets 3 are pressed and securely set between the lower end plug 2 and the structure by way of the spring 4. Removing push bar 19, the rod 11 is forced to move backward in the direction of arrow B to push the steel balls 18 outward (arrow C) by way of the tapered portion 13, so that the steel balls 18 protrude from the holes 17 and are wedged between the tapered portion 13 and the inner periphery of the tube 10 whereby the rod 11, sleeve 15 and the steel balls 18 move as one body and are securely halted in position by the friction between the balls and the tube.

In transportation, any acceleration or force applied to the nuclear fuel pellets in the direction of arrow B intensifies the wedge effect, and therefore the rod never moves in the direction of arrow B so that it keeps the nuclear fuel pellets at the proper position. Enough space is provided in the full volume of the tube between the structure and the upper end plug to accommodate the reactive gases.

What is claimed is:

1. A nuclear fuel element comprising: an elongated tube, upper and lower end plugs fixed to respective ends of said tube, nuclear fuel pellets disposed within said tube, a setting structure for securely setting and maintaining said pellets in position within said tube, and a spring interposed between and urging apart said pellets and said setting structure, said setting structure comprising a sleeve axially slidable in said tube and having a plurality of holes about the circumference thereof, a rod axially slidable in said sleeve and having a tapered portion thereon and having an end portion in engagement with said spring, and a plurality of balls each movably inserted in one of said holes and engageable between said tapered portion of said rod and the inner wall of said tube in response to axial sliding of said rod in a direction away from said pellets so as to releasably wedge said setting structure in place to thereby set and maintain said pellets in position within said tube.

* * * * *